Patented Oct. 10, 1922.

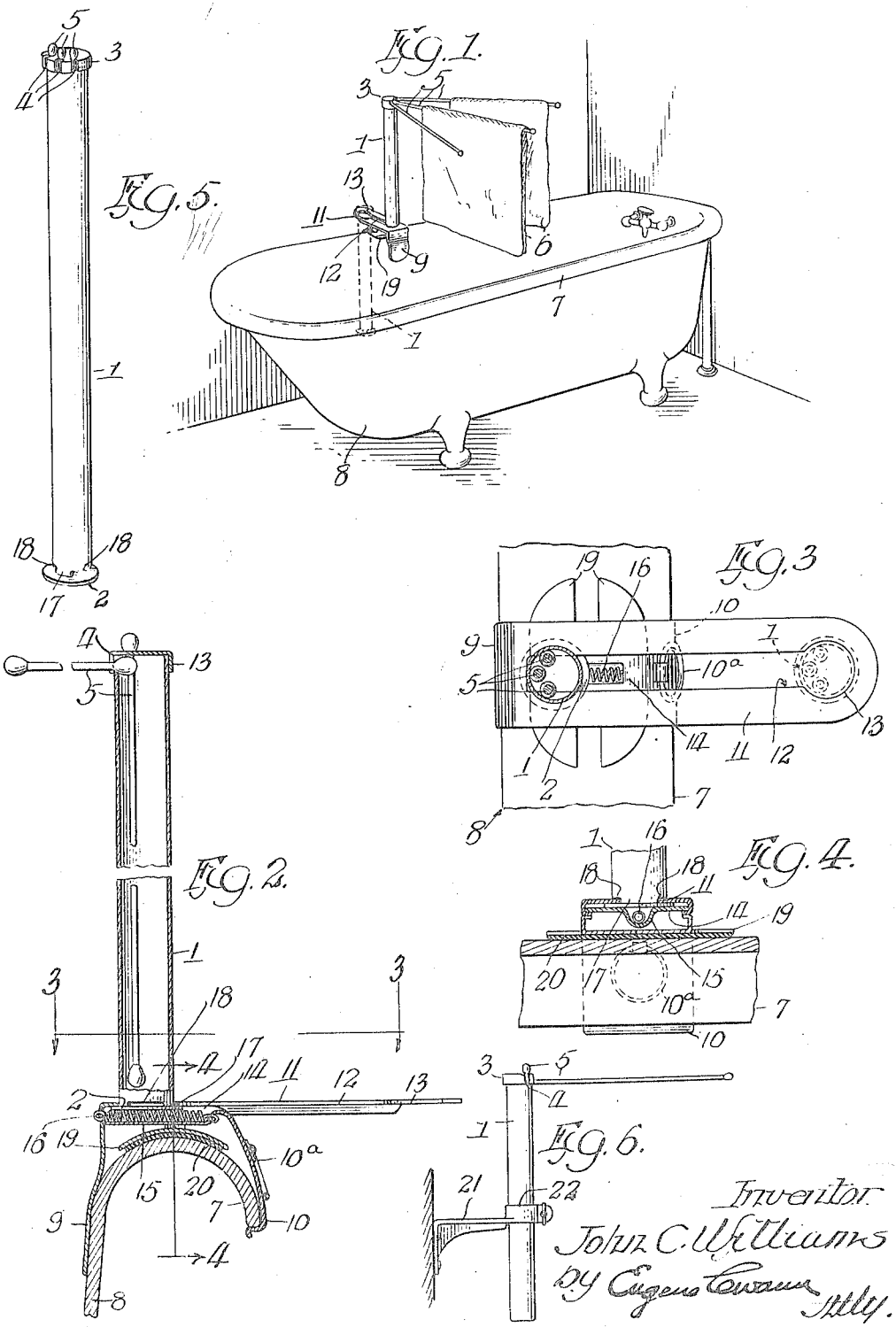

1,431,611

UNITED STATES PATENT OFFICE.

JOHN C. WILLIAMS, OF CHICAGO, ILLINOIS.

TOWEL RACK.

Application filed October 3, 1921. Serial No. 505,070.

*To all whom it may concern:*

Be it known that I, JOHN C. WILLIAMS, a citizen of the United States, residing at Chicago, in the county of Cook and State of Illinois, have invented new and useful Improvements in Towel Racks, of which the following is a specification.

This invention relates to towel racks.

One object of my invention is to provide a tubular casing for the towel supporting rods and to connect the rods with the casing in a manner permitting any or all of the rods to be pushed back into the casing from towel supporting position and thus be housed and out of the way when not in use.

A further object of my invention is to provide at the base or lower end of the casing a means whereby the casing may be detachably clamped to the rolled flange of a bath-tub at any place about the edge of the tub and thus enable the rack to be mounted on and used in connection with a tub.

A still further object of my invention is to connect the casing with said means in a manner permitting the casing with contained rods to be lowered alongside of the tub and thus be below the edge of the tub and out of the way when not in use.

And another object of my invention is to provide such a connection with the casing and said clamp that the casing may be turned to direct the rods either over or away from the tub or other support.

The invention consists further in the matters hereinafter described and more particularly set forth in the appended claims.

In the accompanying drawing—

Fig. 1 is a perspective view of a towel rack of my invention and shown clamped on the edge of a bath-tub;

Fig. 2 is a vertical sectional view of the rack;

Figs. 3 and 4 are horizontal and vertical sectional views, respectively, taken on lines 3—3 and 4—4 of Fig. 2;

Fig. 5 is a perspective view of the tubular casing with all of the towel supporting rods housed within the same; and Fig. 6 is a view showing my improved rack applied to a wall of a bath-room or other place where the rack may be used.

The towel rack of my invention comprises a tubular casing 1 having at its lower end a disc 2 and at its upper end a cap 3. Said cap 3 is provided at one side with a number of radial slots 4, which open upwardly through the top of the cap and also through the side thereof.

In the slots 4 are rods 5, one for each slot and all having substantially the same length and of a length no greater than that of the casing. The rods 5 have their ends enlarged and preferably ball shaped with their inner ends in the casing 1 and their outer ends outside of the same. By reason of the slots 4, any or all of the rods 5 may be pulled upward from the casing and dropped or turned into positions extending outward therefrom at substantially right-angles thereto for supporting towels 6, as shown in Fig. 1.

The enlarged inner ends of the rods prevent the same from being completely withdrawn and removed from the casing 1. After the towels are removed from the rods 5, the rods may be raised and slid back into the casing 1, their enlarged outer ends seating on the cap 3 and preventing the rods from dropping completely into the casing, as shown in Fig. 5. These outer ends being outside of the cap 3 enable the rods to be grasped for drawing them out of the casing 1 and swinging into towel supporting positions. When all of the rods 5 are in the casing 1, they are housed by the latter and thus are completely out of the way when the rack is not in use.

For detachably clamping the casing 1 to the rolled flange 7 of a bath-tub 8, I provide a means comprising inner and outer jaw members 9, 10. The former is secured to or made integral with a plate 11 arranged at substantially right-angles to said jaw and extending over the outer jaw 10. Said plate 11 is provided with an elongated slot 12 extending longitudinally thereof and having at its outer end a circular opening 13, as shown in Fig. 3. The outer jaw 10 has a top plate 14 extending toward the jaw 9 and slidably engaged with the inturned edges of the plate 11, as shown in Fig. 4. This plate 14 is recessed as at 15 to accommodate a coiled spring 16, one end being secured to the jaw 9 and the other end to the jaw 10, the spring acting to constantly draw the movable jaw 10 toward the fixed one 9 and hold them in tight engagement with the rolled flange 7, as shown in Fig. 2. To facilitate opening the jaws, the movable one is provided with a pull ring or finger piece $10^a$, as shown.

The casing 1 is connected with the disc 2 by diametrically arranged, depending tongues 17, 17, which space the disc slightly below the lower end of said casing and provide guide slots 18, 18 to receive the side edges of the slot 12 and thus permit the casing 1 to be slid from one end of the slot to the other. This permits the casing 1 to be moved from a position adjacent the fixed jaw 9 to a position into the circular opening 13. The opening 13 is slightly larger in diameter than the casing 1 to allow the casing to be dropped down below the plate 11 until its cap 3 engages the top of the plate and supports the casing in lowered position. Thus the casing 1 may be dropped down at the side of the tub, after the rods 5 are in the same, so that it will be out of the way and, not project above the tub 8 to interfere with a free use of it when the towel rack is not needed, as shown in dotted lines in Fig. 1.

When the rack is in use, the casing 1 is drawn up through the opening 13 and slid forward in the slot 12 until over the clamp, whereupon the rods 5 may be drawn upward and swung downward into towel supporting position, as shown in Figs. 1 and 2.

The guide slots 18, 18, being separated by the tongues 17, permit the casing when in the opening 13 to be turned to direct the rods 5 either over or away from the tub 8.

For steadying the rack when in use on a tub as 8, there is a bearing plate 19 secured to the plate 11 below the same and between the jaws 9 and 10, as shown in the drawings. This plate is curved to correspond with the curvature of the rolled flange 7 and may be shod or lined with a sheet or pad 20 of rubber or other resilient material to prevent scarring or damaging the enameled finish of the tub when the rack is used therewith. The jaws 9, 10 may be likewise lined.

Should it be desired to secure the rack of my invention to a wall, the plate 11 and associated clamp will be omitted. As shown in Fig. 6, there is a wall bracket 21 having a split clamp 22 to engage the casing 1 in any position of its length for supporting the rack from a wall or other like support.

The towel rack of my invention has the advantage of providing an enclosing or housing casing for the rods 5 when not in use, and thus provides a neat and finished appearance for the construction. Moreover, by reason of the plate 11 and the associated clamp, the rack may be readily clamped to the rolled flange of a bath-tub at any place about the same and the casing 1 may be positioned so as to direct the rods when extended either over or out of the tub, as the user may desire. Moreover, when the rack is not in use, the rods 5 may be dropped into the casing 1 and the latter dropped down alongside of the tub to be out of the way and not project above the tub to interfere with the free use of it, when there is no need for the rack.

While I have shown and described herein in detail a towel rack embodying the features of my invention, it is of course to be understood that the details of construction and arrangement of parts may be variously changed and modified without departing from the spirit and scope of my invention.

I claim as my invention:

1. A towel rack, comprising a tubular casing, towel supporting rods slidably mounted in the casing at its upper end and adapted to be pulled out of the casing and extended into towel supporting positions and to be moved back into and housed by the casing when not in use, and means at the lower end of the casing for clamping it to the upper edge of a bath-tub and permitting said casing with contained rods to be dropped into a position at the side of said tub and extending below the upper edge thereof.

2. A towel rack, comprising a tubular casing, a cap at the upper end of said casing and having radial slots opening through the top and side of said cap, towel supporting rods slidable in said slots and having enlarged inner and outer ends, a plate at the lower end of said casing, and jaws carried by said plate for detachably clamping said casing to the upper edge of a bath-tub, said casing having its lower end slidably connected with said plate, said plate having an opening permitting said casing with contained rods to be dropped down to one side of said tub and extending below the upper edge thereof.

3. A towel rack, comprising a tubular casing, a cap at the upper end of said casing and having radial slots opening through the top and side of said cap, towel supporting rods slidable in said slots and having enlarged inner and outer ends, a plate at the lower end of said casing, and jaws carried by said plate for detachably clamping said casing to the upper edge of a bath-tub, said plate having an elongated slot in which the lower end of said casing is slidably mounted; said slot having an enlarged portion at one end permitting the casing with contained rods to be dropped below said plate.

4. A towel rack, comprising a tubular casing, a cap at the upper end of said casing and having radial slots opening through the top and side of said cap, towel supporting rods slidable in said slots and having enlarged inner and outer ends, a plate at the lower end of said casing, and jaws carried by said plate for detachably clamping said casing to the upper edge of a bath-tub, said plate having an elongated slot, said casing having oppositely arranged guide grooves at its lower end to engage the sides of said slot, said slot having an enlarged portion at one end permitting the casing to be turned for directing the rods when extended therefrom either over or out of said tub.

5. A towel rack, comprising a tubular casing, a cap at the upper end of said casing and having radial slots opening through the top and side of said cap, towel supporting rods slidable in said slots and having enlarged inner and outer ends, a plate at the lower end of said casing and connected therewith, two jaws carried by said plate for detachably clamping the rack to the upper edge of a bath-tub, one jaw being fixed to said plate and the other jaw having sliding engagement therewith, and spring means interposed between and connected with said jaws for drawing the movable jaw toward the fixed one.

6. A towel rack, comprising a tubular casing, a cap at the upper end of said casing and having radial slots opening through the top and side of said cap, towel supporting rods slidable in said slots and having enlarged inner and outer ends, a plate at the lower end of said casing and connected therewith, two jaws carried by said plate for detachably clamping the rack to the upper edge of a bath-tub, one jaw being fixed to said plate, and the other jaw having sliding engagement therewith, a member carried by said plate between said jaws and to seat on the upper edge of the tub, and spring means interposed between and connected with said jaws for drawing the movable jaw toward the fixed one.

7. A towel rack, comprising a tubular casing, a cap at the upper end of said casing and having radial slots opening through the top and side of said cap, towel supporting rods slidable in said slots and having enlarged inner and outer ends, a plate at the lower end of said casing and connected therewith, two jaws carried by said plate for detachably clamping the rack to the upper edge of a bath-tub, said plate having channel-ways at the sides thereof, one jaw being fixed to said plate, and the other jaw being slidably engaged with said channel-ways, and spring means interposed between and connected with said jaws for drawing the movable jaw toward the fixed one.

8. A towel rack, comprising a tubular casing, a cap at the upper end of said casing and having radial slots opening through the top and side of said cap, towel supporting rods slidable in said slots and having enlarged inner and outer ends, a plate at the lower end of said casing and connected therewith, two jaws carried by said plate for detachably clamping the rack to the upper edge of a bath-tub, said plate having channel-ways at the sides thereof, one jaw being fixed to said plate and the other having a portion beneath said casing and slidably engaged in said channel-ways, and a spring interposed between said jaws and connected therewith for drawing the movable jaw toward the fixed one, the portion of said movable jaw being recessed to receive said spring.

9. A towel rack, comprising a tubular casing, a cap at the upper end of said casing and having radial slots opening through the top and side of said cap, towel supporting rods slidable in said slots and having enlarged inner and outer ends, a plate at the lower end of said casing and connected therewith, said plate having its side edges inturned to form channels, two jaws carried by said plate, said jaws being shaped to detachably engage the rolled flange of a bath-tub, one jaw being fixed to said plate, and the other jaw having sliding engagement with said channels, one of said jaws having a hooked end to engage under the outer edge of said rolled flange, spring means interposed between and connected with said jaws for drawing the movable jaw toward the fixed one, and a finger grasping member on the movable jaw.

10. A towel rack, comprising a tubular casing, a cap at the upper end of said casing and having radial slots opening through the top and side of said cap, towel supporting rods slidable in said slots, and having enlarged inner and outer ends, a plate at the lower end of said casing and connected therewith, two jaws carried by said plate for detachably clamping the rack to the upper edge of a bath-tub, one jaw being fixed to said plate, and the other jaw having sliding engagement therewith, and a spring interposed between and connected with said jaws for drawing the movable jaw toward the fixed one, said plate having an elongated slot in which the lower end of said casing is slidably mounted, said slot having an enlarged end portion permitting the casing with contained rods to be dropped below said plate.

In testimony that I claim the foregoing as my invention, I affix my signature, this 30th day of September, A. D. 1921.

JOHN C. WILLIAMS.